May 16, 1933.   E. P. BURRELL   1,909,166
HYDRAULIC OPERATING SYSTEM FOR MACHINE TOOLS
Filed Dec. 5, 1930   5 Sheets-Sheet 1

Patented May 16, 1933

1,909,166

UNITED STATES PATENT OFFICE

EDWARD P. BURRELL, OF SHAKER HEIGHTS, OHIO, ASSIGNOR TO THE WARNER & SWASEY COMPANY, OF CLEVELAND, OHIO, A CORPORATION OF OHIO

HYDRAULIC OPERATING SYSTEM FOR MACHINE TOOLS

Application filed December 5, 1930. Serial No. 500,313.

This invention relates to a hydraulic control system for machine tools, and more particularly to a hydraulic operating system for machine tools having a movable member whose rate of movement is to be accurately controlled.

The invention finds particular utility in connection with machine tools, such as lathes, wherein the movable member is a tool or work holding slide which is movable in opposite directions along the ways of the bed, a member of this kind usually being given a forward movement, then a feeding movement, and then a return movement.

The principal object of the present invention is to provide, in a machine tool, an improved hydraulic actuating system for the movable member, including control means for insuring a constant movement of said member during the feeding movement regardless of the variable leakage factor in the hydraulic system or other factors which might tend to cause an irregular movement.

A further object is to provide an improved hydraulic actuating system for the movable member of a machine tool wherein is used a fluid supply of constant volume and a valve for controlling the rate of fluid supplied to the machine to regulate the movement of the movable member.

A still further object is to provide an improved hydraulic actuating system for the movable member of a machine tool including a constant delivery pump and a valve for automatically controlling the rate of fluid supply to regulate the feeding movement of the movable member.

A further additional object is to provide an improved hydraulic actuating system for the movable member of a machine tool, including a control valve and means for effecting the rapid forward and return movements of said member at the same speed for a given valve opening, together with means for automatically controlling the valve during the feeding movement of said member.

The above and other objects are attained by the present invention, which may be here briefly summarized as consisting in certain novel combinations and arrangements of parts and details of construction which will be described in the specification and set forth in the appended claims.

My control system may be used to advantage with many different kinds of machine tools, but a particularly important field of use includes machine tools having a reciprocating tool or work holding member which is usually given a relatively slow feeding movement which must be of a constant nature regardless of leakage and regardless of varying pressures on the sliding member by the action of the tool or tools on the work. Accordingly, I have illustrated my invention applied to such a machine tool, the particular tool being a turret lathe, and the hydraulically operated reciprocating member being in this instance a turret slide, but it is to be understood that in so illustrating the invention I do not limit any part or all of the novel features to a machine tool of this type or to the turret slide, since it might be applied to a cross slide of a lathe or to any other sliding member which has a relative movement with respect to another member of the machine.

The control device and valve are illustrated herein as arranged on a fixed part of the machine, such as the bed, but it should be understood that they may be carried by a movable part of the machine, such as the slide.

In the accompanying drawings.

Referring now to the drawings, the machine tool or lathe here illustrated is provided with a bed 10 having ways 11 on which the hydraulically actuated sliding member, in this instance in the form of a tool supporting turret slide 12, is mounted, this slide being movable toward and from the relatively stationary head of the lathe (not shown in the drawings). In some cases the work piece is supported in the sliding member and the tool or tools in the member which is relatively stationary in so far as longitudinal movement is concerned, and of course the invention is equally applicable to that type of machine tool.

In a machine of the type herein illustrated, provided with a turret slide 12 having a tool holding turret 13, the tools are adapted to be mounted on the several faces of the turret, as is well known in the art, the tools being caused to successively operate on the work, and each cycle of movement including a forward movement of the slide to bring the tool adjacent the work, then a relatively slow feeding movement for the cutting operation, then the stopping of the slide, followed by a predetermined dwell of the tool at the completion of the cut, and a return movement back to the point where the cycle is to be repeated. The turret is indexed before the commencement of each forward movement of the slide so as to properly position the tool or tools which are supported on the next or adjacent face of the turret and which operate during the next cycle of operation, as is well understood.

Many of the parts of the lathe may be of standard construction. For example, the indexing mechanism for the turret may be of any of the usual standard forms employed in the customary mechanically operated turret lathes wherein the turret indexing takes place automatically during the latter portion of the return movement of the turret slide or manually when the slide has reached its most rearward position. As these are standard in machines of this kind, they are not herein illustrated. As before stated, the turret slide 12 of this machine is moved hydraulically back and forth over the ways 11, and by this is meant, of course, by means of a motor comprising a suitable relatively movable cylinder and piston and suitable actuating fluid, generally a special oil, which is supplied through a valve under pressure to either side of the piston by a suitable pump $12^a$ which is preferably of the constant delivery type. Of course, any suitable pump which supplies the fluid at the required pressure may be utilized, which pump will have the usual relief valve $12^b$ which will act at any predetermined pressure. The pump $12^a$ and the relief valve $12^b$ are illustrated as located in the bed 10 (see Fig. 2), but they might be located in any convenient place desired. The pump may be driven by a power shaft from the gearing in the head of the machine, this connection not being shown as it is well understood in the art.

Figures 2, 3, 9:
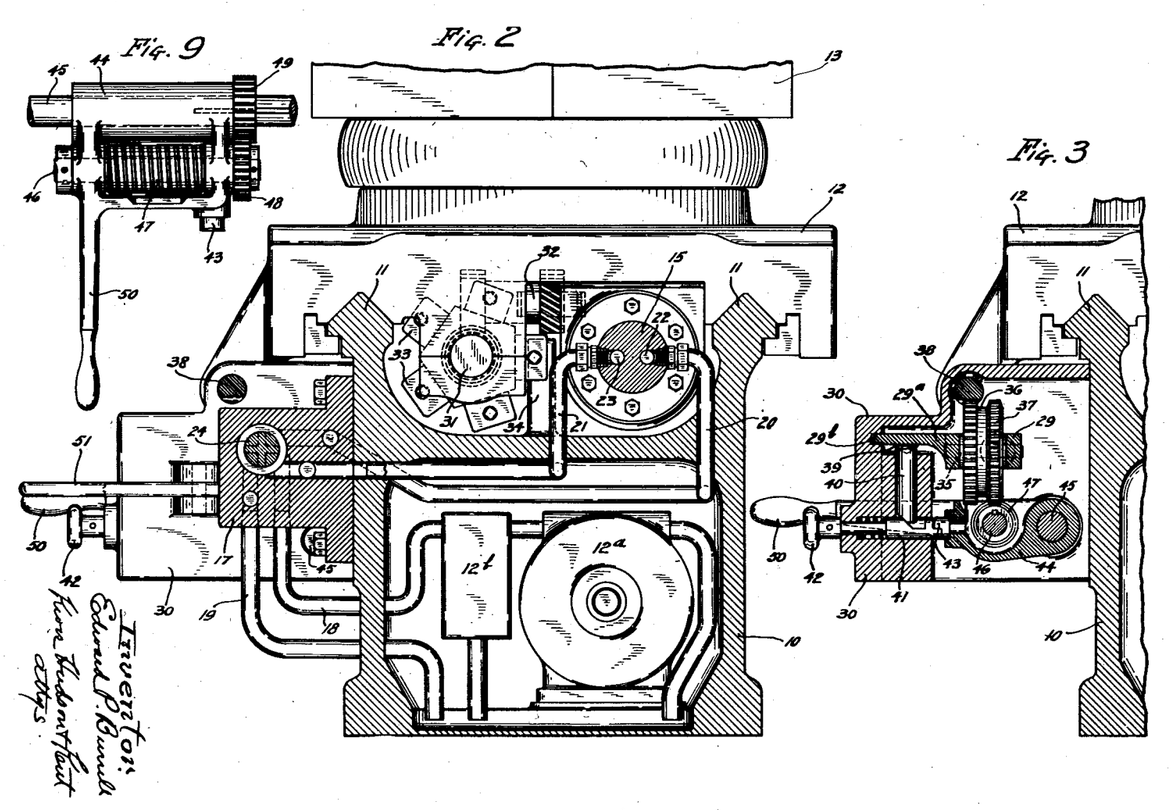
Fig. 2 is a sectional view of the turret lathe taken substantially on line 2—2 of Fig. 1, looking in the direction of the arrows and showing the pump and relief valve in the bed of the lathe.
Fig. 3 is a sectional view taken on line 3—3 of Fig. 1, looking in the direction of the arrows.
Fig. 9 is a detail view showing certain parts of the mechanism.
Figure 4:
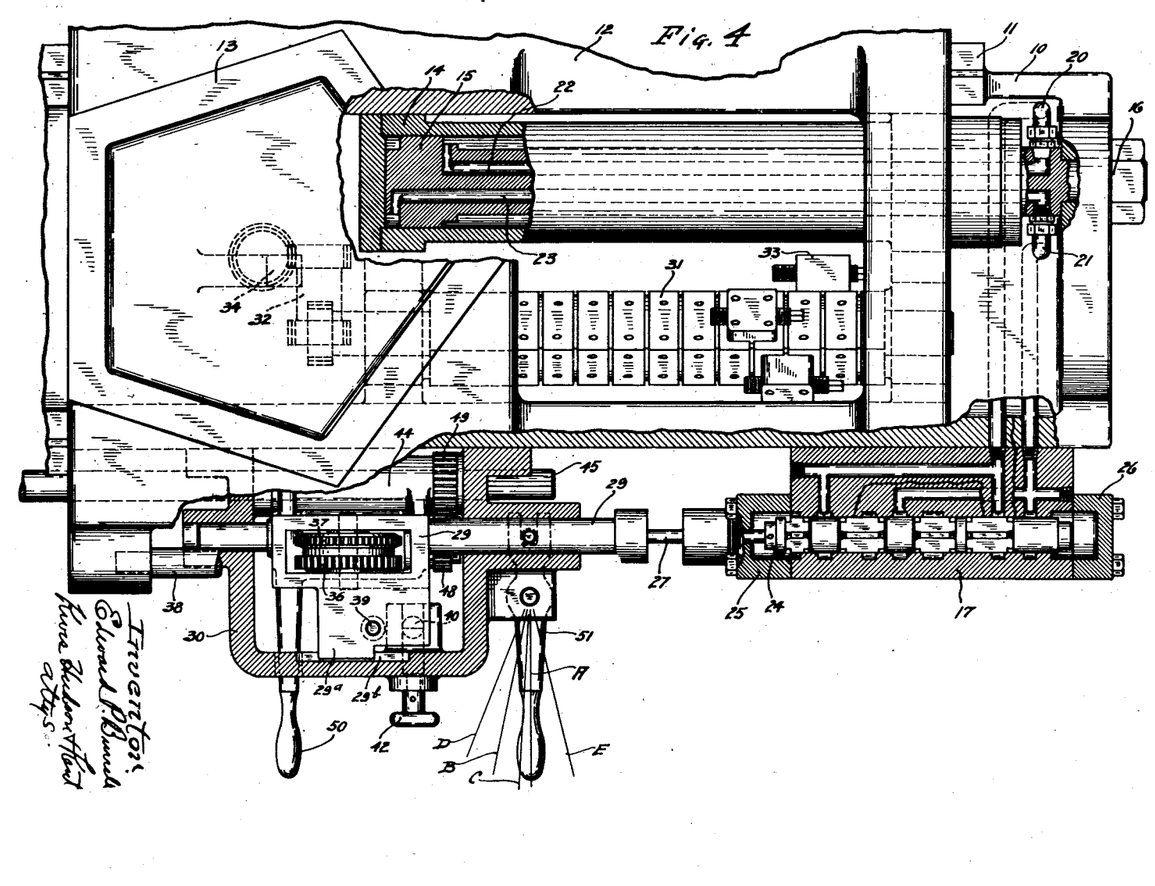
Fig. 4 is a top plan view of Fig. 1, certain parts of the turret lathe being shown in section.

The cylinder 14 and the piston and piston rod 15 which actuate the turret slide 12 are mounted in the bed 10, see Figs. 2 and 4. For convenience, the cylinder 14 is attached in any suitable manner to the lower side of the turret slide, and the piston and piston rod are stationary, Fig. 4 showing the end of the piston rod 15 suitably secured at 16 in the rear end of the bed 10. The actuating fluid is supplied to the cylinder on opposite sides of the piston through the medium of a control valve and including a valve housing 17 which in this case is secured to the front part of the bed. Fluid is supplied from the pump $12^a$ to the valve chamber under suitable constant pressure and volume by a pipe 18 and is exhausted from the valve chamber by a pipe 19. The valve chamber has delivery connections to the cylinder 14 on opposite sides of the piston. These connections may be established in different ways, but in this instance they are established by pipes 20 and 21 which are connected to passageways 22 and 23 respectively extending through the piston rod 15 and having outlets into the cylinder on opposite sides of the piston. The pipe 21 and passageway 23 are for the purpose of supplying motive fluid to give the slide a forward movement while the pipe 20 and passageway 22 supply the fluid to the cylinder for causing the return movement of the slide. It will be understood that when the fluid is being supplied by the pipe 21 and passageway 23, to one side of the piston, the fluid is being exhausted from the other side by way of the passageway 22 and pipe 20, and when the fluid is supplied to the other side of the piston by way of pipe 20 and passageway 22 to actuate the slide, the pipe 21 and passageway 23 exhaust the fluid from the opposite side of the piston.

Figure 5:
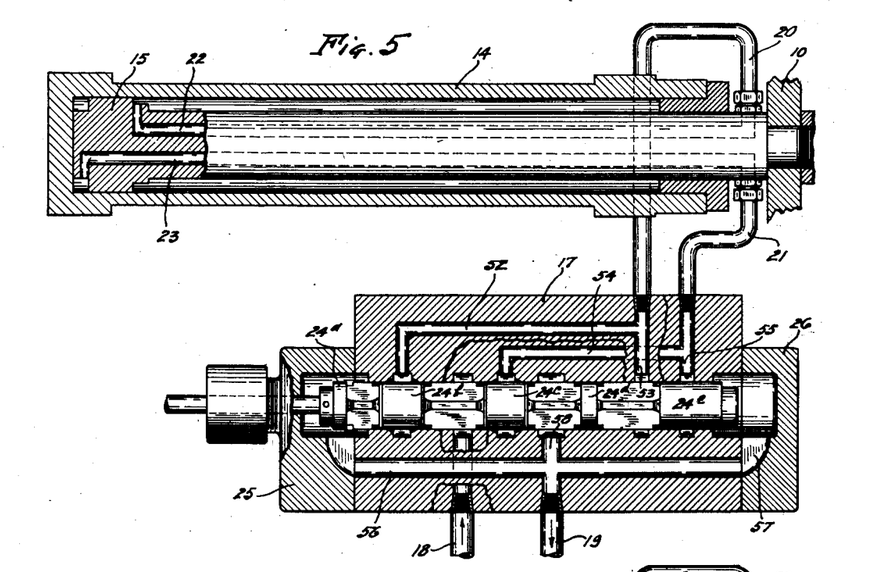
Fig. 5 is a diagrammatic view showing in section the motor for actuating the slide of the lathe and the valve for controlling the movement of the slide, together with the passageways between the valve and the motor, the valve being in neutral position in this view.

It should be noted that the projected or pressure area of the cylinder bore at the left of the piston, as viewed in Fig. 5, is twice the projected or pressure area of the bore at the right of the piston, due to the fact that the size of the piston rod is such that the ratio of these projected or pressure areas is two to one.

The control valve consists of a valve housing in which a cylindrical bore constituting a valve chamber is formed for the movable valve member 24, the ends of the bore being closed by end plates 25 and 26, the end plate 25 having a suitable stuffing box formed thereon. Slidable endwise in the bore of the valve chamber is the movable valve member 24 which, as here shown, has five cylindrical portions indicated respectively at 24ᵃ, 24ᵇ, 24ᶜ, 24ᵈ and 24ᵉ. These cylindrical portions are connected by reduced skeleton portions and are adapted to cover and uncover ports in the cylinder bore of the valve chamber, which ports communicate with the delivery and exhaust pipes 18 and 19.

This valve member, which is designed to have endwise horizontal movement in the valve housing, has connected to it a valve rod 27 which extends through the stuffing box on the end plate 25 and is connected in this instance by a lost motion connection 28 to the end of the control slide 29 of a control unit including a housing 30 which is in this instance bolted or otherwise secured to the bed 10 forwardly of the valve chamber 17 and adjacent thereto.

It is customary in turret lathes to provide a so-called stop roll with a series of adjustable stops thereon to positively stop the forward movement of the turret slide at the completion of the cutting operation. This stop roll is usually in the form of a polygonal drum having as many faces as there are faces on the turret and the stops for the different cycles of movement of the slide are secured to the different flat faces of the stop roll. In this instance, I use the usual stop roll, the same being illustrated in Figs. 2 and 4 at 31, this stop roll being supported by and movable with the slide 12. The stop roll is connected with the turret by any suitable gearing 32, indicated in Figs. 2 and 4, so that the roll will be given a step-by-step rotation each time the turret is indexed. The stops, which are adjustably mounted on the roll, are shown at 33, one of these stops at the end of each forward movement of the slide coming into contact with a suitable fixed stop, indicated at 34 in Figs. 2 and 4, the fixed stop 34 being integral with or secured to the bed 10.

Referring again to the control mechanism arranged in the housing 30, it will be noted that the valve rod 27 connected to the valve member is in turn connected to the control slide 29, which is slidably supported for horizontal movement in the housing 30. The slide 29 has cylindrical portions at its opposite ends and intermediate these portions is provided with an outwardly extending portion 29ᵃ in the form of a tongue entering a groove 29ᵇ in the wall of the housing 30 (see Fig. 3) to maintain the slide 29 in the proper position and to prevent turning or rotation thereof.

The forwardly extending portion 29ᵃ of the slide is provided with an opening within which is mounted upon a stub shaft 35 a gear unit, including a spur gear 36 and a worm wheel 37 integrally or otherwise united for rotation toegther. The spur gear 36 meshes with an elongated rack 38 suitably connected to a projecting arm formed on the slide 12 so as to move with the slide.

The forwardly projecting portion 29ᵃ of the slide 29 is provided on its under side with a camming dog 39 arranged to engage with the end of a camming plunger 40 slidably carried in the housing 30. The opposite end of the plunger 40 engages a catch pin 41 with a camming action so that when the plunger 40 is depressed the catch pin 41 will be moved outwardly against spring pressure. The catch pin 41 is provided with an outwardly extending portion projecting through the front wall of the housing 30 and provided at its end with a knob 42. The inner end of this catch 41 cooperates with a catch member 43 carried by a bracket 44 pivotally mounted in the housing 30 upon a shaft 45.

The bracket 44 has journaled therein a shaft 46 upon which is fixed a worm 47 which meshes with the worm wheel 37 of the gear unit when the bracket is in the position shown in Fig. 3, at which time the catch member 43 is engaged with the inner end of the catch pin 41 in order that the bracket may be held in this position. A gear 48 is fixed on the shaft 46, see Fig. 9, and meshes with a gear 49 having a keyed relation with the shaft 45 between the bracket 44 and the end wall of the housing 30.

It will thus be seen that the bracket 44 is free to rock on the shaft 45 which constitutes its pivotal center without disturbing the intermeshing relationship between the gears 48 and 49 whereby the worm 47 can be constantly driven by the shaft 45. The shaft 45 is connected through suitable gearing to the spindle in the head of the machine (not shown in the drawings). It should be understood that the shaft 45 is driven in this manner in predetermined relationship with the spindle in the head for a purpose which will be referred to presently.

A handle 50 is connected to the bracket 44 and extends beyond the front wall of the housing 30 (see Figs. 3 and 9) for the purpose of swinging the bracket to bring the worm 47 into mesh with the worm wheel 37. It will thus be seen that when the catch pin 41 is pulled outwardly manually by the knob 42 or through the action of the dog 39 and camming plunger 40, the inner end of the catch pin 41 will be disengaged from the catch member 43 carried by the bracket and the bracket will swing downwardly and the worm 47 will be disengaged from the worm wheel 37. When the worm 47 is disengaged from the worm wheel 37, the gear unit of which the worm wheel is an element will be rotated idly by movement of the rack 38 which meshes with the gear 36 of the unit, in which event the control slide 29 is free to be shifted manually by the lever 51 (see Fig. 4), the control slide 29 being provided with a downwardly extending pin engaging the forked inner end of the lever. It will be understood, of course, that the shifting of the control slide 29 moves the valve 24 since the valve is connected to the control slide by means of the valve rod 27 and therefore the valve can be manually shifted by means of the lever 51.

The valve housing 17 is provided with a pair of passageways 52 and 53 connected to the pipe 20 and with a pair of passageways 54 and 55 connected to the pipe 21, all of such passageways, of course, communicating with the valve chamber through suitable ports. The valve housing is further provided with passageways 56, 57 and 58 connected to the discharge pipe 19, the passageways 56 and 57 being in communication with the opposite ends of the valve chamber, while the passageway 58 communicates with the valve chamber through a port in the valve housing intermediate the ends of the chamber.

When the center line of the lever 51 lies in the position A (see Fig. 4), the valve is in the neutral position, as shown in Fig. 5, and the inlet pipe 18 with its port is closed by the cylindrical portions 24$^b$ and 24$^c$ of the valve while the exhaust pipe 19 with its port is closed by the cylindrical portions 24$^c$ and 24$^d$. It should be noted further that when the valve is in this position the passageways 56 and 57 are closed by the cylindrical portions 24$^b$ and 24$^e$ respectively. Of course when the valve is in the neutral position, there will be no flow of fluid in the system to and from the cylinder 14 and the slide will be at rest.

Figure 6:
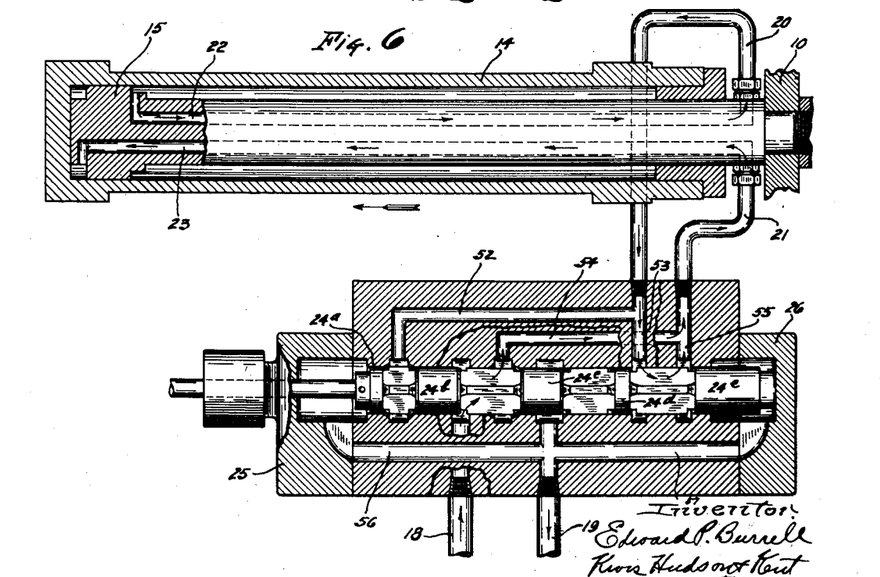
Fig. 6 is a view similar to Fig. 5 with the valve shown in position for the forward movement of the slide.

In order to bring the slide into the cutting position for the tool, the lever 51 is moved until its center line is substantially in the position B, as shown in Fig. 4, and the valve has been shifted toward the right as viewed in Fig. 6. This movement of the valve opens the port for the inlet pipe 18 and also uncovers the port for the passageway 54 which is connected with the pipe 21 and the passageway 23, so that the fluid is free to enter the cylinder 14 to the left of the piston 15, as viewed in Fig. 6, with the result that the slide and cylinder will be moved toward the head of the machine or in the direction indicated by the arrow in Fig. 6. It should further be noted that when the valve is in the position shown in Fig. 6, the passageway 22 and pipe 20 exhaust the fluid which is in the cylinder to the right of the piston 15 and that this fluid is free to pass through the passageway 53 into the valve chamber and outwardly thereof through the passageway 55 into the pipe 21 and to thus join the incoming fluid passing into said pipe through the passageway 54. With this arrangement, the exhausted fluid from the cylinder 14 at the right of the piston 15 is carried along with the incoming fluid into the cylinder to the left of the piston.

It will be remembered that the projected or pressure area of the cylinder bore at the left of the piston is twice the projected or pressure area to the right of the piston (as viewed in the drawings) and therefore twice the amount of fluid would be required to fill the cylinder to the left of the piston for a given movement of the slide as will be required to fill it to the right of the piston for the same movement in the same period of time, provided the valve opening in each instance is the same. With the present arrangement, the time required with the same valve opening for filling the cylinder and for moving the slide a given distance in either direction is equal, due to the fact that the exhausted fluid is conducted into the cylinder to the left of the piston along with the incoming fluid. In other words, only one-half the amount of fluid required to move the slide forwardly a given distance in a given time will pass through the valve 24.

As soon as the tool or tools have reached their cutting position, the worm 47 is engaged with the worm wheel 37 by means of the lever 50 to start the automatic movement of the control slide 29, as will be presently explained, and the lever 51 is automatically moved by the control slide 29 so that its center line lies substantially along the line C of Fig. 4. The movement of the control slide 29 shifts the valve to the feeding position as shown in Fig. 7 and a differential action will automatically take place during the feeding movement of the tool slide in which the port openings of the valve for the incoming and exhausted fluids will be controlled as shown in Fig. 7.

Figure 7:
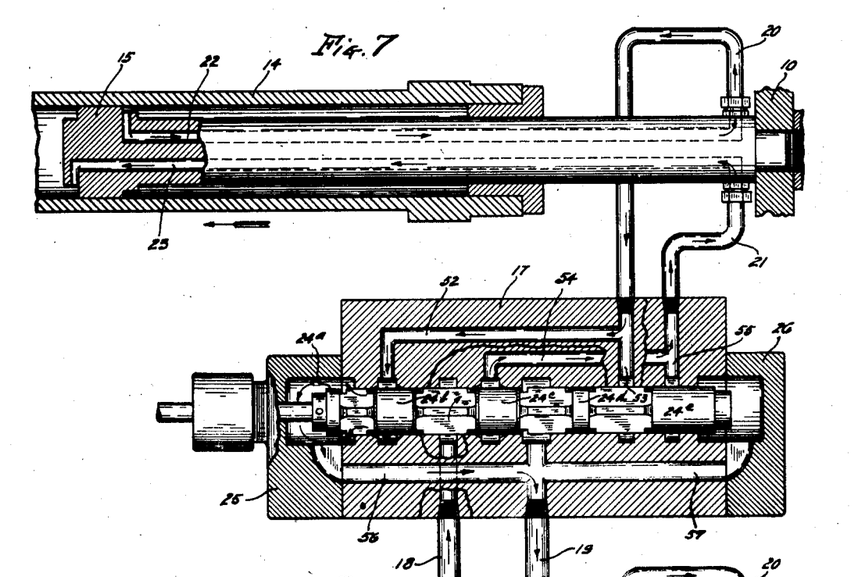
Fig. 7 is a view similar to Figs. 5 and 6 but showing the valve in position for the feeding movement of the slide.

Referring to Fig. 7, it will be seen that the cylindrical portion 24$^c$ of the valve is now in a position such that the port to the passageway 54 is only partially opened, with the result that the incoming fluid passes through the port from the pipe 18, through the valve and through the partially opened port into the passageway 54, thence to the pipe 21 and through the passageway 23 into the cylinder 14 to the left of the piston 15. The fluid exhausted from the cylinder 14 passes through the passageway 22 and pipe 20 into the passageway 52 in the valve housing. The cylindrical portion 24$^b$ of the valve partially covers the port connected with the passageway 52 so that a certain amount of the exhausted fluid is free to pass through the port into the valve and through the passageway 56 into the exhaust pipe 19. It will be noted that the port to the passageway 53 and the port to the passageway 55 are closed by the cylindrical portions 24ᵈ and 24ᵉ of the valve.

Since the worm 47 is now in mesh with the worm wheel 37 of the gear unit carried by the control slide 29, it will be seen that the rate of movement of the main slide 12 controls, through the rack 38 and gear 36, the movement of the control slide 29, with the result that the valve 24 is automatically positioned or reciprocated to control the amount of incoming and exhausted fluid passing therethrough required for the desired constant rate of feeding movement of the main slide. If the rate of movement of the main slide 12, with the rack 38 and the gear 36 carried by the control slide 29, is the same as the worm 47 which is driven in timed relation with the spindle in the head, there will be no movement of the control slide 29 and the valve will be stationary in its proper position. However, as soon as there is a difference in the rate of movement between the main slide 12 and gear 36 and the worm 47, the control slide 29 will be moved automatically to change the position of the valve and thus increase or diminish the uncovered portions of the ports for the passageways 52 and 54 in the valve housing, thus varying the amount of fluid passing through the valve to maintain the constant feeding movement of the main slide, disregarding any leakage of fluid or other factors which might make such rate of movement variable.

Figure 1:
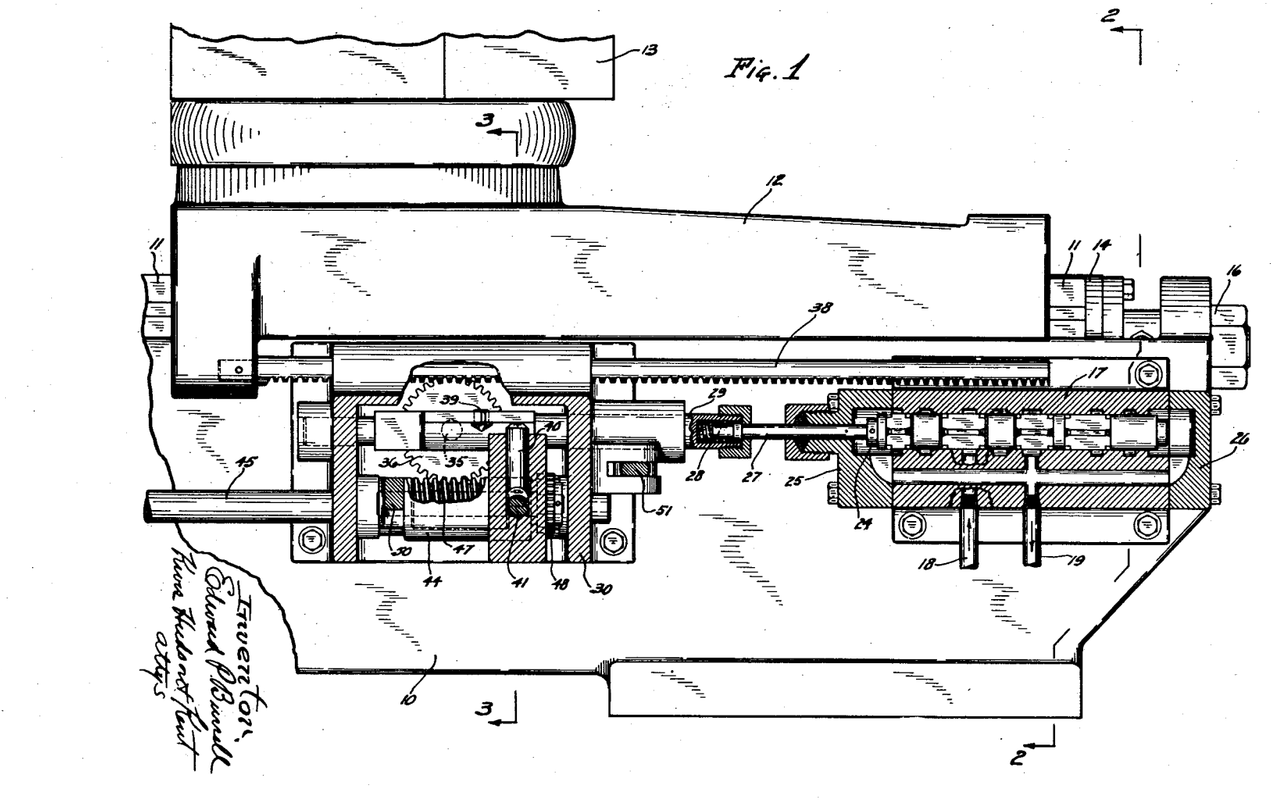
Figure 1 is a fragmentary side elevation of a turret lathe equipped with my invention, certain parts of the lathe being shown in section.

Upon the completion of the feeding movement, one of the stops 33 carried by the stop roll 31 of the main slide will abut the stop 34 arranged on the bed 10 and thus positively arrest the movement of the main slide. The movement of the main slide having been arrested, a differential in the rate of movement of the gear 36 and worm 47 will be created, with the result that the control slide 29 will be moved to the right, as viewed in Figs. 1 and 4, and the camming dog 39 will contact with the upper end of the camming plunger 40 to depress the same and retract the catch pin 41, thus disengaging the inner end of said catch pin from the catch member 43 carried by the bracket 44 and allowing said bracket to swing downwardly and move the worm 47 out of engagement with the worm wheel 37. This movement of the control slide 29 first moves the valve to the rapid forward position, as shown in Fig. 6, in which position the righthand end of the valve abuts the end plate 26 of the valve housing. The movement of the control slide 29 continues after the valve has been moved to the position shown in Fig. 6, and during this further movement of the control slide 29, the spring in the lost motion connection 28 (see Fig. 1) is compressed and the action of the camming dog 39 upon the camming plunger 40 takes place to disengage the worm 47 from the worm wheel 37. It will be seen that from the time that the movement of the main slide is stopped until the worm 47 has been disengaged from the gear 37, a period of dwell will be created, during which time the tool or tools will be relieved of any spring and the cut finished.

When the worm 47 is disengaged, the lever 51 will be substantially in the position indicated by the center line D in Fig. 4, and due to the action of the spring of the lost motion connection 28, the control slide and lever will be moved automatically so that the lever will be substantially in the position indicated by the center line B. Now, in order to effect the return movement of the main slide, the operator moves the control lever 51 substantially to the position indicated by the center line E in Fig. 4, thus shifting the valve from the position shown in Fig. 6 to the position shown in Fig. 8.

Figure 8:
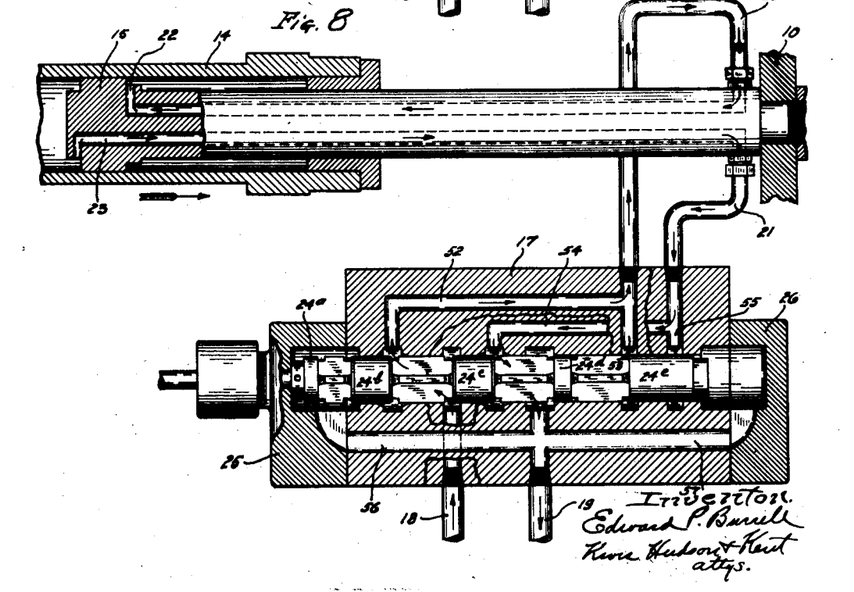
Fig. 8 is a view similar to Fig. 5 but showing the valve in position for the return movement of the slide.

The valve 24 has now been moved to its most lefthand position (as viewed in the drawings), and the port connected to the pipe 18 is uncovered so that the incoming fluid may pass through the valve and through the port connected to the passageway 52 which has also been uncovered, and thence through pipe 20 and passageway 22 into the cylinder 14 to the right of the piston. The port connected to the exhaust pipe 19 is now uncovered, as is also the port connected to the passageway 54, whereupon the exhausted fluid may pass through the passageway 23, pipe 21 and passageway 54 through the valve into the exhaust pipe 19.

It will further be seen that the cylindrical portion 24ᵉ of the valve covers the port connected to the passageway 55 and that the port connected to the passageway 53 is closed by the cylindrical portions 24ᵈ and 24ᵉ. In addition, it will be seen that the cylindrical portion 24ᵇ closes the valve chamber to the passageway 56 so that there will be no flow of fluid through this passageway. When the valve has been shifted to this position, the cylinder and the main slide will be traveling rearwardly in the direction of the arrow in Fig. 8.

It will be remembered that during the forward movement and up to the commencement of the feeding movement of the slide the exhausted fluid is combined with the incoming fluid for effecting such movement, with the result that only one-half of the required amount of fluid to fill the cylinder at the left side of the piston to move the cylinder and slide a given distance in a given time passed through the valve. However, during the return movement of the cylinder and slide, the exhausted fluid is drained and only the incoming fluid is utilized to effect such return movement. It will thus be seen that the same amount of fluid passes through the valve in effecting the forward movement up to the feeding movement as passes therethrough in effecting the return movement, with the result that the same speed of the slide is obtained with a given valve opening for a given distance in the same time in both the forward and rearward movements of the slide. This relationship in the amount of fluid passing through the valve during both the initial forward movement and the rearward movement is brought about by the fact that the projected or pressure areas in the bore of the cylinder on opposite sides of the piston are in the ratio of two to one.

When the main slide has reached its most rearward position, the piston 15 will abut the lefthand end of the cylinder 14, as viewed in the drawings, at which time the operator may move the lever 51 to the neutral position, indicated by the center line A in Fig. 4, to stop the operation of the machine, or he may move this lever to the forward position, indicated by the center line B, to initiate a new cycle of operation.

From the foregoing description, it will be seen that the cycle of operation of the machine is manually initiated by the operator moving the lever 51 to the forward position, indicated substantially by the center line B in Fig. 4, and that during such movement the valve 24 is shifted from the neutral position shown in Fig. 5 to the position shown in Fig. 6. The forward movement of the main slide up to the commencement of the feeding movement is effected by means of the combined incoming and exhaust fluids flowing into the cylinder 14 to the left of the piston, there being no fluid exhausted from the valve during this movement and the incoming or pressure fluid passing through the valve being only one-half the amount of fluid required to fill the cylinder at the left of the piston within a given time. As soon as the main slide has moved forward sufficiently to bring the tool or tools into cutting position, the operator moves the lever 51 from the forward position to the neutral position or from position B to position A, thus moving the valve into neutral position, and then by means of the lever 50 moves the worm 47 into engagement with the worm wheel 37 to commence the feeding movement and to effect the automatic control of the valve due to the differential action between the control slide 29 and the rate of movement of the worm 47, at which time the movement of the control slide 29 moves the lever 51 to feeding position, indicated substantially by the line C in Fig. 4.

During the feeding movement of the main slide, it will be remembered that the valve is automatically controlled to govern the rate of fluid which passes therethrough to move the slide at a constant rate of feed regardless of leakage or other variable factors in the machine. As soon as the main slide reaches the end of the feeding movement, its movement is arrested by one of the stops 33 on the stop roll abutting the stop 34 on the bed. This stopping of the main slide 12 causes the control slide 29 to be moved to the right as viewed in Fig. 1, due to the differential action between the worm and the slide, such movement in turn moving the valve 24 to its farthest righthand position, as shown in Fig. 6. The movement of the slide 29 continues after the valve has been thus positioned and compresses the spring of the lost motion connection 28 between the control slide and the valve rod 27. This additional movement of the control slide 29 causes the camming dog 39 to engage and depress the camming plunger 40, which in turn retracts the catch pin 41 and allows the bracket and worm 47 to swing downwardly to disengage the worm from the worm wheel. At the time the disengagement of the worm commences, the lever 51 is substantially in the position D, but as soon as the worm has been disengaged from the worm wheel, the compressed spring of the lost motion connection moves the control slide 29 to the left and returns the lever 51 substantially to the position B.

It will be seen that during the feeding movement of the main slide the fluid exhausted from the cylinder is exhausted from the valve and that only the incoming or pressure fluid is utilized to effect the feeding movement of the slide. It will be further seen that after the feeding movement of the slide has been positively arrested and until the worm is disengaged from the worm wheel, there will be a period of time constituting a dwell during which the spring of the tool or tools will be removed and the cut finished.

Now, in order to bring about the rearward movement of the main slide, the operator moves the control lever 51 from position B to position E, which movement causes the valve to be shifted from the position shown in Fig. 6 to its farthest lefthand position as viewed in Fig. 8. When the valve is in the position shown in Fig. 8, the incoming or pressure fluid passes through the valve to the righthand side of the piston while the fluid exhausted from the cylinder passes through the valve into the exhaust pipe. In effecting this return movement of the slide, only the incoming or pressure fluid is utilized, although the slide is moved rearwardly for the same valve opening at the same rate of speed at which it is moved forwardly up to the commencement of the feeding movement, due to the two to one ratio between the projected or pressure areas in the cylinder on opposite sides of the piston. Near the end of the rearward movement of the slide, the turret may be automatically indexed or upon the completion of the rearward movement of the slide the turret may be manually indexed in order to have the machine in readiness for a new cycle of operation. As soon as the slide has reached its rearmost position, the piston will abut the lefthand end of the cylinder, at which time the operator may move the lever 51 into the forward position indicated at B in Fig. 4 to commence a new cycle of operation, or he may move the lever into the neutral position indicated at A to stop the operation of the machine.

It will be seen that during both the idle forward movement and the return movement of the main slide, the rate of movement in both directions will be the same for a given valve opening and that the same amount of pressure fluid will pass through the valve for the same movement of the slide in either direction, and during the feeding movement of the slide the valve is automatically controlled to regulate the amount of pressure fluid passing therethrough to give a uniform rate of feeding movement to the slide, disregarding any leakage or other factor which might tend to cause such rate of movement to be variable.

While I have shown one form of my invention, the same being applied to a lathe, it will be understood that the mechanism may be modified in many particulars and that it may be applied to other types of machine tools than turret lathes. I therefore aim in my claims to cover all modifications and adaptations which do not involve a departure from the spirit and scope of my invention.

Having thus described my invention what I claim is:

1. In a machine tool, a support, two movable members thereon, hydraulic means for moving one of said members on said support relative to the other member including a pump, a motor having a piston and provided with different pressure areas on opposite sides thereof, and a control valve for conducting the fluid exhausted from one end of said motor to the pressure fluid to be returned therewith to the other end of said motor during a portion of the relative movement between said members, and means operatively connected with both of said members for controlling the valve during another portion of the relative movement between said members to effect constant movement of the hydraulically moved member.

2. In a machine tool, a support, two movable members thereon, hydraulic means for moving one of said members in opposite directions on said support and relative to the other member including a pump, a motor having a piston and provided with different pressure areas on opposite sides thereof, and a control valve, said valve adapted to conduct the fluid exhausted from one end of said motor to the pressure fluid to be returned therewith to the other end of said motor during a portion of the relative movement of said members in one direction, and means operatively connected with both movable members to control said valve during the remainder of the relative movement between said members in the same direction to effect constant movement of the hydraulically moved member.

3. In a machine tool having a support, two movable members thereon, hydraulic means for moving one of said members on said support relative to the other including a pump, a motor having a piston and provided with different pressure areas on opposite sides thereof, and a control valve, said valve adapted to conduct the fluid exhausted from one end of said motor to the pressure fluid to be returned therewith to the other end of said motor during a portion of the relative movement between said members, and means for controlling the movement of said hydraulically moved member during another portion of the relative movement between said members comprising a differential mechanism connected with said control valve and both movable members to effect constant movement of said hydraulically moved member.

4. In a machine tool, a support, two movable members thereon, one of said members having on said support a rapid and a slow movement in one direction and a return movement relative to the other member, hydraulic means for effecting said movements including a motor having a piston and provided with different pressure areas on opposite sides thereof, a control valve, a pump, inlet and exhaust passageways between the motor and valve and between the valve and pump, said valve adapted to return the exhaust fluid from the motor to the inlet passageway of the motor during said rapid movement and to exhaust the fluid from the motor to the pump during the return movement, and means operatively connected with both movable members and said valve for governing said valve to control the rate of the incoming and exhaust fluids to and from the motor during the slow movement.

5. In a machine tool, a support, two movable members thereon, a motor for moving one of said members on said support relative to the other in opposite directions comprising a cylinder and a piston the pressure areas of which are different on opposite sides of the piston, hydraulic means for actuating said motor including a control valve, a pump and passageways connecting said motor, pump and valve, said valve directing the fluid to said motor to actuate said motor at the same speed for the same valve opening during the entire relative movement of said member in one direction and during a portion of the relative movement thereof in the opposite direction, and means operatively connected with said valve and both movable members to control said valve during the remainder of the relative movement between said members in the last mentioned direction.

6. In a machine tool, a support, two movable members thereon, hydraulic means for moving one of said members on said support relative to the other member including a constant delivery pump and a hydraulic motor, and a valve for directing the fluid to said motor and for controlling the movement of the hydraulically moved member, said valve being operatively connected with both movable members.

7. In a machine tool having a support, two movable members thereon, hydraulic means for moving one of said members on said support relative to the other including a constant delivery pump and a hydraulic motor, and a valve for directing the fluid to said motor and for controlling the movement of said hydraulically moved member, a differential mechanism connected to said valve and including gear members connected to both of said members.

8. A machine tool having a support, two movable members thereon, hydraulic means for actuating one of said members including a constant delivery pump, a motor, a control valve, for directing and controlling the rate of flow of the fluid to said motor, connections between said pump, valve and motor, and differential means operatively connected to said members and said valve to control said valve to give constant motion to said hydraulically actuated member irrespective of leakage.

9. In a machine tool having a support, a rotatable member and a slidable member thereon, hydraulic means for actuating said slidable member including a constant delivery pump, a motor, a control valve for directing the fluid to said motor, connections between said pump, valve and motor, and differential means operatively connected to said members to control said valve to control the rate of flow of fluid to said motor to impart a constant motion to said slidable member irrespective of leakage.

10. In a machine tool having two members one of which is movable in opposite directions, hydraulic means for moving said movable member including a constant delivery pump, a motor, a control valve for directing the fluid to said motor, connections between said pump, valve and motor, and differential means operatively connected to said members and said valve to control said valve to govern the rate of flow of fluid to said motor to give constant motion to said movable member during a portion of the movement of said member in one direction irrespective of leakage in the hydraulic system.

11. In a machine tool, a support, two movable members thereon, hydraulic means for moving one of said members on said support relative to the other member including a constant delivery pump, a motor having a piston and provided with different pressure areas on opposite sides thereof, and a control valve for directing the fluid to said motor and for conducting the fluid exhausted from one end of the said motor to the pressure fluid to be returned therewith to the other end of said motor during a portion of the relative movement between said members, and means operatively connected with both of said members for controlling the valve during another portion of the relative movement between said members to effect constant movement of the hydraulically moved member.

12. In a machine tool having a support, two movable members thereon, hydraulic means for moving one of said members on said support relative to the other including a constant delivery pump, a motor having a piston and provided with different pressure areas on opposite sides thereof, and a control valve for directing the fluid to said motor, said valve adapted to conduct the fluid exhausted from one end of said motor to the pressure fluid to be returned therewith to the other end of said motor during a portion of the relative movement beween said members, and means for controlling the movement of said hydraulically moved member during another portion of the relative movement between said members comprising a differential mechanism connected with said control valve and both movable members to effect constant movement of said hydraulically moved member.

In testimony whereof, I hereunto affix my signature.

EDWARD P. BURRELL.